UNITED STATES PATENT OFFICE.

WILLIAM JOHN KNOX, OF GOLDFIELD, NEVADA, ASSIGNOR, BY DIRECT AND MESNE ASSIGNMENTS, TO KNOX THENARDINE CHEMICAL COMPANY, OF NEW YORK, N. Y., A CORPORATION OF WEST VIRGINIA.

ANTISEPTIC COMPOUND.

1,139,774.     Specification of Letters Patent.     Patented May 18, 1915.

No Drawing.     Application filed April 20, 1909. Serial No. 491,205.

*To all whom it may concern:*

Be it known that I, WILLIAM JOHN KNOX, a citizen of the United States of America, residing at Goldfield, in the county of Esmeralda and State of Nevada, have invented new and useful Improvements in Antiseptic Compounds, of which the following is a specification.

The primary object of this invention is to so treat highly pure concentrated hydrogen peroxid as to render it permanently stable. It is not contemplated to employ for this purpose the weak three per cent. *U. S. Pharmacopœia* preparation but hydrogen peroxid of greater strength and purity, that is of such strength and purity as would otherwise be extremely unstable, and this object also contemplates the preservation of hydrogen peroxid without the admixture of other substances.

Another object of this invention is to provide an antiseptic dressing or compound which shall be highly antiseptic and germicidal and at the same time emollient, non-irritating and non-toxic, and which shall retain these properties when in contact with acid, alkaline, or other natural or diseased bodily excretions.

The antiseptic reagent employed is hydrogen peroxid, $H_2O_2$, preferably in a pure concentrated and naturally unstable form and the emollient vehicle is a mixture of paraffin of the $C_nH_{2n+2}$ series of hydrocarbons, both of which with their properties are well known.

In the following specification and claims the word paraffin shall be taken to comprise any mixture of paraffin of the general formula represented by $C_nH_{2n+2}$ of any viscosity or melting point from the lighter naphthas to the heaviest wax.

By hydrogen peroxid shall be understood the chemical compound represented by the formula $H_2O_2$, of such purity as is customarily designated by the term technically chemically pure, and not the commercial acidified aqueous solution of the *U. S. Pharmacopœia* but of greater strength and purity.

In order that the process and the nature of the product which I have invented may be made clear it will be necessary to describe the present state of the art.

It is well known that the molecular structure of hydrogen peroxid is that of a supersaturated molecule and that its atoms are in a state of unstable equilibrium. It is to this unstable quality that it owes its intense chemical activity, but for the same reason it is difficult to preserve it from breaking down or dissociating for any length of time as ordinarily prepared. It is reduced to water, $H_2O$, not only by organic matter and other reducing agents but by contact with many metallic oxids, such as manganese dioxid, $MnO_2$, in presence of acids; by many metallic oxids by mere contact, such as manganese dioxid by which it is broken up without causing any change in the metallic oxid. It also reacts with such oxids as silver oxid, both being reduced to the lower form. By mere contact with such inert substances as charcoal and metallic gold, platinum, and silver it is catalytically decomposed. It is also decomposed by all alkalis however weak. It is for the latter reason that the aqueous solution of hydrogen peroxid must be rendered acid by adding a free inorganic acid in order to prevent dissociation. It is also dissociated by heat near or above its boiling point. It is also a well known fact that all finely divided particles, such as mineral matter, barium sulfate, barium fluorid, or other insoluble inert matter must be removed by careful and repeated filtration or the resultant aqueous solution will deteriorate by catalytic dissociation. Another, and the chief cause, of the dissociation of the ordinary hydrogen peroxid, is based upon the chemical law that reduced pressure or tension causes dissociation or greater instability. In the aqueous solution the molecules of hydrogen peroxid, $H_2O_2$, are brought to the surface of the liquid by convection and its atoms being in a state of active or wide movement or vibration are projected into the free atmosphere above the liquid and on account of the reduced tension and the weak molecular attraction do not recombine and dissociation results. The inventor has found that if the hydrogen peroxid molecule be removed from atmospheric contact and subjected to an external increased tension this tendency to dissociate is neutralized or reversed.

The object of this invention is primarily to enmesh or increase hydrogen peroxid in a technically pure and concentrated state and therefore unstable in a chemically inert, neutral, elastic vehicle or vesicle, so that the impurities that cause dissociation will be excluded; so that it will be removed from contact with the atmosphere and sunlight; and so that its globules will be subjected to an increased tension, by which means the causes of dissociation are eliminated and the hydrogen peroxid molecule is rendered positively stable. This the inventor has accomplished by enmeshing finely divided particles or globules of technically pure hydrogen peroxid in a semi-solid, viscous, or semi-fluid mixture of paraffins or simply to accord with the special definition, paraffin, thereby inhibiting its tendency to dissociate.

The paraffins of the $C_nH_{2n+2}$ series are found in petroleum and are of saturated, stable, molecular structure and are also inert to chemical reagents or compounds. This property of paraffins of chemical inactivity or inertness to chemical reaction, like that of nitrogen, is possessed by no other liquid, viscous, or solid compound. This characteristic is so strong that the most powerful acids, or alkalis, the most delicate chemical compounds may be kept in contact with it without the slightest chemical change or reaction taking place either in the reagent or the paraffin. Another property of paraffin that has been discovered and demonstrated by the inventor, is that paraffin instead of dissolving or becoming wet by contact with hydrogen peroxid, has a repulsive action upon it, as oil repels water, thus when inclosing hydrogen peroxid it causes its molecules and atoms to be driven back upon themselves, causing them to unite and to be maintained in a constantly stable condition.

By the term "paraffin" as used herein I do not mean the commercial article commonly sold under that name, but use the term to designate the series of chemical compounds known as the methane series, whose empirical formula conforms to the molecular composition expressed by $C_nH_{2n+2}$, and which are free from unsaturated hydrocarbons which are present in commercial paraffin due to the processes of producing the same. Paraffin as commercially known is not available for my purpose, as the methods of fractioning by heat in producing the same results in "cracking" or splitting up the methane compounds into unsaturated compounds which would react with the hydrogen peroxid and destroy it.

Another object in view in employing paraffin that is also due to its chemical inertness is to obtain a substance that when in contact with bodily tissues, such as the mucous membrane, the epidermis, sores or open wounds, will act as an absolutely neutral, stable, chemically inactive emollient covering. It will not itself break down into harmful products and will insulate the parts from external infection, and maintain them in an antiseptic condition.

In carrying out my invention I first prepare the concentrated aqueous solution of hydrogen peroxid uncombined with other ingredients and therefore extremely unstable by one of the well known methods, preferably by means of barium peroxid or dioxid, $Ba O_2$, converting this into barium dioxid containing eight molecules of water of combination, and treating the latter compound suspended in pure water with dilute phosphoric acid, $H_3PO_4$, care being taken to keep the temperature at about 10° C. and the solution at all times slightly acid, then adding sulfuric acid to slight acidity, and carefully decanting and filtering the hydrogen peroxid solution from the insoluble barium salt.

Care is taken to use clean vessels, of inert material, such as porcelain, and to keep the temperature at a low point, preferably around 10° C. in the subsequent mixing or enmeshing in paraffin. I have used for this purpose, on the small scale porcelain mortars, and on a larger scale porcelain ball mills.

My method of procedure in making the simple emollient antiseptic mixture is to add the pure concentrated hydrogen peroxid to a suitable quantity of paraffin whose temperature is maintained below thirty-five degrees C. in the mixing vessel and to cause their even, intimate admixture by stirring and attrition until the globules of hydrogen peroxid are not visually apparent.

I have found that pure or technically pure hydrogen peroxid enmeshed in paraffin will retain practically its full strength indefinitely but when applied to a surface will act antiseptically with the full strength of the hydrogen peroxid.

The viscosity and melting point of the paraffin will vary with the purpose for which the mixture will be used. It may be either liquid, semi-viscous, viscous, or solid.

Another method of preparation is by first concentrating the aqueous solution of hydrogen peroxid by means of refrigeration or cold fractional crystallization, and then adding this concentrated solution to the paraffin. A portion of water is not objectionable in the case of the milder forms of the emollient antiseptic, and in this specification and claims the words hydrogen peroxid will be understood as applicable to that reagent either water free or containing more or less water. This is necessary as in the manufacture there is apt to be some unavoidable breaking down of the hydrogen peroxid into the form of water.

Another modification of my invention consists in forming the mixture of hydrogen peroxid and paraffin by first dissolving both in a common volatile solvent and subsequently removing the volatile solvent by evaporation or distillation at a low temperature leaving an even, homogeneous almost molecularly intermingled mass. In using paraffin of a high melting point in this modification of the process, in order to obtain a solid product, I first dissolve or soften the paraffin by means of ether. To this softened paraffin, or to the ether solution of paraffin, I now add the concentrated ether solution of hydrogen peroxid, although hydrogen peroxid is not soluble in paraffin, both are soluble in ether and the resulting mixture of the two in the common solvent gives a perfect homogeneous mixture in molecular subdivision. The next operation is to distil off or evaporate the ether, carrying it off to a suitable condenser. The temperature is maintained at as low a point as possible, and agitation of the mixed solution is desirable. The resultant mixture consists of solid paraffin with hydrogen peroxid evenly and finely disseminated throughout.

My invention comprehends various mixtures of paraffins and hydrogen peroxid ranging from one per cent. to thirty per cent. in a highly concentrated hydrogen peroxid. For ordinary external applications a smaller quantity of hydrogen peroxid is desirable; for application to virulent wounds or sores a strongly antiseptic mixture is made. The result in any case is an emollient, non-irritating, non-toxic, antiseptic dressing or application in which the hydrogen peroxid is not only highly concentrated but very pure, and would be, if not thus enmeshed highly unstable. This chemical stability of the concentrated pure hydrogen peroxid when thus incased has been demonstrated for long periods of time by the inventor.

Having thus fully described my invention, I claim as my invention and desire to secure by Letters-Patent:

1. An antiseptic surgical dressing consisting of concentrated hydrogen peroxid in finely-divided globules enmeshed in a paraffin chemically of the methane series and which is chemically inert to the hydrogen peroxid.

2. An antiseptic surgical dressing consisting of concentrated hydrogen peroxid in finely-divided globules inclosed in an elastic neutral vehicle which is chemically inert to the hydrogen peroxid.

In testimony whereof I affix my signature in the presence of witnesses.

WILLIAM JOHN KNOX.

Witnesses:
HENRY M. FARNAM,
E. F. HANSON,
W. S. EBERMAN.